(12) United States Patent
Zingg et al.

(10) Patent No.: US 7,798,015 B2
(45) Date of Patent: Sep. 21, 2010

(54) MAGNETO-INDUCTIVE FLOWMETER AND MEASURING TUBE FOR SUCH

(75) Inventors: Thomas Zingg, Basel (CH); Simon Stingelin, Pratteln (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/434,224

(22) Filed: May 16, 2006

(65) Prior Publication Data

US 2006/0272427 A1    Dec. 7, 2006

Related U.S. Application Data

(60) Provisional application No. 60/682,376, filed on May 19, 2005.

(30) Foreign Application Priority Data

May 16, 2005    (DE)    ........................ 10 2005 023 216

(51) Int. Cl.
*G01F 1/58*    (2006.01)
(52) U.S. Cl. .................................................. 73/861.12
(58) Field of Classification Search ........................ None
See application file for complete search history.

(56) References Cited

U.S. PATENT DOCUMENTS

| | | | | |
|---|---|---|---|---|
| 2,960,744 A | * | 11/1960 | Blank | ........................ 422/285 |
| 3,286,522 A | * | 11/1966 | Cushing | ................... 73/861.11 |
| 4,050,303 A | | 9/1977 | Hemp | |
| 4,468,619 A | * | 8/1984 | Reeves | ........................ 324/220 |
| 4,671,679 A | * | 6/1987 | Heshmat | ...................... 384/133 |
| 4,741,215 A | * | 5/1988 | Bohn et al. | ............... 73/861.12 |
| 4,882,542 A | * | 11/1989 | Vail, III | ........................ 324/368 |
| 4,903,525 A | * | 2/1990 | Chiba et al. | .................... 73/116 |
| 5,010,433 A | * | 4/1991 | Kitada et al. | ........... 360/327.21 |
| 5,043,668 A | * | 8/1991 | Vail, III | ........................ 324/368 |
| 5,090,250 A | * | 2/1992 | Wada | ........................ 73/861.12 |
| 5,124,866 A | * | 6/1992 | Rothermel | ................... 360/241 |
| 5,141,158 A | * | 8/1992 | Allen | ........................... 239/252 |
| 5,398,553 A | * | 3/1995 | Hemp | ...................... 73/861.15 |
| 5,426,983 A | * | 6/1995 | Julius et al. | ............... 73/861.08 |
| 5,458,003 A | * | 10/1995 | Ishihara et al. | ........... 73/861.12 |
| 5,540,103 A | * | 7/1996 | Zingg | ....................... 73/861.12 |
| 5,541,301 A | * | 7/1996 | Jordine et al. | ............... 534/635 |
| 5,639,989 A | * | 6/1997 | Higgins, III | ................ 174/386 |
| 5,750,902 A | | 5/1998 | Schwiderski | |
| 5,852,247 A | * | 12/1998 | Batey | ....................... 73/861.17 |

(Continued)

FOREIGN PATENT DOCUMENTS

EP    0 207 771 A1    1/1987

(Continued)

OTHER PUBLICATIONS

"First Experimental results on a Magnetoelectric flowmeter" pp. 1041-1046; Moncharmont et al. Jan. 20, 1987.*

(Continued)

*Primary Examiner*—Harshad Patel
(74) *Attorney, Agent, or Firm*—Bacon & Thomas, PLLC (57) ABSTRACT

A measuring tube for a magneto-inductive flow meter is manufactured at least partially of a magnetically conductive material having a relative permeability, $\mu_r$, essentially greater than one.

32 Claims, 8 Drawing Sheets

U.S. PATENT DOCUMENTS

| | | | |
|---|---|---|---|
| 6,051,970 A * | 4/2000 | Hutchings | 324/204 |
| 6,094,992 A * | 8/2000 | Mesch et al. | 73/861.15 |
| 6,154,104 A * | 11/2000 | Hall | 333/160 |
| 6,392,317 B1 * | 5/2002 | Hall et al. | 307/90 |
| 6,437,684 B1 * | 8/2002 | Simeray | 340/5.67 |
| 6,920,799 B1 * | 7/2005 | Schulz | 73/861.52 |
| 7,079,958 B2 * | 7/2006 | Budmiger et al. | 702/45 |
| 2005/0161304 A1 * | 7/2005 | Brandl et al. | 192/223 |
| 2006/0081067 A1 * | 4/2006 | Budmiger | 73/861.08 |
| 2006/0286696 A1 * | 12/2006 | Peiffer et al. | 438/27 |

FOREIGN PATENT DOCUMENTS

| | | |
|---|---|---|
| EP | 0 420 496 A1 | 4/1991 |
| EP | 0 511 595 A1 | 11/1992 |
| GB | 2 297 845 A | 8/1996 |

OTHER PUBLICATIONS

Ferromagnetism- Hyperphysics.phy-astr.gsu.edu/hbase/solids/ferro.html; "Relative Permittivity" by R. Nave; pp. 1-5.*

High Permeability Materials—Microwave Encyclopedia; pp. 1-3; Aug. 2006.*

Which is the magnetic material having relative permeability; p. 1; By Blurtit; Jun. 2007.*

English translation of IPER including cited art, already of record.

* cited by examiner

MAGNETO-INDUCTIVE FLOWMETER AND MEASURING TUBE FOR SUCH

FIELD OF THE INVENTION

The invention relates to a measuring tube for a magneto-inductive flowmeter and to a magneto-inductive flowmeter with such a measuring tube.

BACKGROUND OF THE INVENTION

For measuring electrically conductive fluids, flowmeters utilizing a magneto-inductive measurement pickup are often employed. As is known, especially also the volume flow rate of electrically conducting fluids, especially liquids, flowing in a pipeline, can be measured and the measurements reflected in corresponding, measured values. The measurement principle of magneto-inductive flowmeters rests, as is known, on the fact that an electric voltage is induced due to charge separations in a volume fraction of a flowing fluid traversed by a magnetic field. The voltage is sensed by means of at least two measuring electrodes and further processed in a measuring device electronics of the flowmeter to a corresponding, measured value, for example a measured value of a volume flow rate. Equally known to those skilled in the art is the construction of the individual components and the inner workings of magneto-inductive flowmeters. Examples of this technology are contained in DE-A 43 26 991, EP-A 1 460 394, EP-A 1 275 940, EP-A 12 73 892, EP-A 1 273 891, EP-A 814 324, EP-A 770 855, EP-A 521 169, U.S. Pat. No. 6,763, 729, U.S. Pat. No. 6,658,720, U.S. Pat. No. 6,634,238, U.S. Pat. No. 6,595,069, U.S. Pat. No. 6,031,740, U.S. Pat. No. 5,664,315, U.S. Pat. No. 5,646,353, U.S. Pat. No. 5,540,103, U.S. Pat. No. 5,487,310, U.S. Pat. No. 5,210,496, U.S. Pat. No. 4,704,908, U.S. Pat. No. 4,410,926, US-A 2002/0117009, or WO-A 01/90702.

For conveying the fluid being measured, measurement pickups of the described kind exhibit, as also shown schematically in the appended figures, a measuring tube inserted into the course of the pipeline conveying the fluid. For preventing short-circuiting of the voltage induced in the fluid, the measuring tube is embodied essentially electrically non-conductively, at least on its inside contacting the fluid. For the inserting of the measuring tube into the course of the pipeline conveying the fluid, the ends of the measuring tube are provided with flanges or the like. Measurement pickups of the described kind, as used industrially, have, in such case, most often, a measuring tube built by means of a metal support tube and a coating—the so-called liner—of an electrically insulating material internally applied thereto. The use of a measuring tube built in this way assures, among other things, a mechanically very stable and robust construction of the measurement pickup and thus also of the flowmeter as a whole. As material for the liner, materials such as e.g. hard rubber, polyfluoroethylene, polyurethane or other chemically and/or mechanically durable plastics are used, while the support tubes of the described kind, in order to prevent a degrading of the magnetic field, especially also a possible short circuiting of the same over the measuring tube, are conventionally manufactured of a non-ferromagnetic, especially paramagnetic, material, such as e.g. stainless steel or the like. Thus, by an appropriate selection of the support tube, a matching of the strength of the measuring tube to the mechanical demands present in the particular case of use can be realized, while, by means of the liner, a matching of the measuring tube to the chemical, especially hygienic, demands existing for the particular case of use can be obtained. Usually, in such case, materials are used, which have a nominal, thus effective, or average, relative permeability $\mu_r$, which is essentially smaller than 10, especially smaller than 5. As is known, relative permeability $\mu_r$, measures, in such case, how much the magnetic flux density (=magnetic induction) is increased relative to the magnetic flux density in air or vacuum, whose permeability $\mu_0$ (=induction constant) is, as is known, equal to $1.256 \cdot 10^{-6}$ Vs·Am$^{-1}$, when the material of concern is placed in the same magnetic field, i.e. the permeability $\mu$ of the material being used equals $\mu_r \cdot \mu_0$.

The magnetic field required for the measurement is produced by a corresponding magnetic field system composed of a coil arrangement, including, most often, two field coils, corresponding coil cores and/or pole shoes for the field coils and, as required, magnetically conductive, field-guiding sheets connecting the coil cores outside of the measuring tube. However, there are also magnetic field systems known using only a single field coil. The magnetic field system is usually, as, in fact, indicated in FIG. 1, arranged directly on the measuring tube and held by such.

For producing the magnetic field, an exciter current I delivered by a corresponding measuring device electronics is caused to flow in the coil arrangement. The exciter current is, in the case of modern measurement pickups, usually a pulsed, bi-polar, rectangular, alternating current. U.S. Pat. No. 6,763, 729, U.S. Pat. No. 6,031,740, U.S. Pat. No. 4,410,926, or EP-A 1 460 394 give examples of circuit arrangements serving to produce such exciter currents, as well as corresponding switching and/or control methods therefor. Such a circuit arrangement includes, usually, an energy, or power, supply driving the coil current, as well as a bridge circuit, in the form of an H-, or T-, circuit, for modulating the exciter current.

The voltage, generated in the fluid according to Faraday's law of induction, is sensed (to provide the measured voltage) between at least two galvanic (thus wetted by the liquid), or at least two capacitive (thus e.g. arranged within the tube wall of the measuring tube), measuring electrodes. In the most common case, the measuring electrodes are so arranged diametrally opposite one another that their shared diameter is perpendicular to the direction of the magnetic field and thus perpendicular to the diameter, on which the coil arrangements lie; equally as well, the measuring electrodes can, however, also be arranged non-diametrally opposite one another on the measuring tube; compare, in this connection, especially U.S. Pat. No. 5,646,353. The measured voltage sensed by means of the measuring electrodes is amplified and conditioned by means of an evaluating circuit to provide a measurement signal, which can be recorded, displayed or even further processed. Corresponding measuring electronics are likewise known to those skilled in the art, for example from EP-A 814 324, EP-A 521 169, or WO-A 01/90702.

As already indicated, for measurement pickups of the described kind, guidance of the magnetic field within and outside of the measuring tube has a special importance. Usually applied measures for influencing the magnetic field include, along with the use of non-ferromagnetic measuring tubes, for example, as described among other places also in U.S. Pat. No. 6,595,069, the use of suitably formed pole shoes arranged for the field coils as close as possible to the fluid and/or the use of magnetically conductive, especially ferromagnetic, materials for the guideback of the magnetic field outside of the measuring tube.

A significant disadvantage of such measurement pickups with metal support tube is to be seen in the fact that, on the one hand, considerable technical skill is required, in order to form and guide the magnetic field in degree sufficient for the required accuracy of measurement. On the other hand, the use, associated therewith, of relatively expensive, non-ferromagnetic metals for the support tubes, such as e.g. paramagnetic stainless steels, represents another significant cost factor in the manufacture of measurement pickups of the described kind. A further disadvantage of conventional magnetic field systems is that the magnetic field is, as schematically pictured in FIG. 1, very inhomogeneously developed inside of the measuring tube lumen and, therefore, the measured voltage can depend in significant measure also on the flow profile of the fluid in the measuring tube.

SUMMARY OF THE INVENTION

An object of the invention is, therefore, to improve magneto-inductive measurement pickups toward the goal that, on the one hand, a cost-favorable manufacture of the same can occur, and that, on the other hand, the character of the magnetic field required for the measurement can be optimized in simple and cost-favorable, yet, at the same time, efficient manner.

For achieving this object, the invention resides in a measuring tube for a magneto-inductive flowmeter, serving to convey an electrically conductive fluid, wherein the measuring tube is at least partially, especially predominantly, composed of a magnetically conductive material, which has a relative permeability, $\mu_r$, which is essentially greater than 1, especially greater than 10.

Additionally, the invention resides in a magneto-inductive flowmeter for a fluid flowing in a line, wherein the flowmeter includes such a measuring tube.

A basic idea of the invention is to achieve an improvement of the efficiency of the magnetic field system by equipping the magneto-inductive measurement pickup with, instead of the magnetically non-, or only to a very small degree, conductive measuring tubes ($\mu_r$ approx 1), with measuring tubes of magnetically highly conductive material ($\mu_r \gg 1$).

The invention rests, in such case, on the surprising discovery that, by using magnetically highly conductive material for the measuring tube, both a considerable amplification and also a considerable equalizing and, thus, a homogenizing of the magnetic field can be effected.

An advantage of the invention is that this improvement of the magnetic field system can be achieved even by means of measuring tubes of the described kind, which are far more cost-favorably manufacturable, as compared to conventional measurement pickups.

BRIEF DESCRIPTION OF THE DRAWINGS

Details of the invention, as well as advantageous embodiments, will now be explained in greater detail on the basis of the examples of embodiments shown in the figures of the drawing for a magneto-inductive flowmeter, as well as on the basis of magnetic field data experimentally determined for various configurations of the measurement pickup of the invention. The figures show as follows.

DESCRIPTION OF THE PREFERRED EMBODIMENTS

In a first embodiment of the measuring tube of the invention, the metal components of the measuring tube and/or the entire measuring tube are made predominantly of magnetically conductive material.

In a second embodiment of the measuring tube of the invention, its magnetically conductive material has a relative permeability, $\mu_r$, which is essentially greater than 10, especially greater than 20.

In a third embodiment of the measuring tube of the invention, its magnetically conductive material has a relative permeability, $\mu_r$, which is smaller than 1000, especially smaller than 400.

In a fourth embodiment of the measuring tube of the invention, its magnetically conductive material has a relative permeability, $\mu_r$, which lies in a range between 20 and 400.

In a fifth embodiment of the measuring tube of the invention, at least one central tube segment of the measuring tube, especially along a closed periphery of the measuring tube, is composed of the magnetically conductive material.

In a sixth embodiment of the measuring tube of the invention, the magnetically conductive material is distributed, especially uniformly, essentially over an entire length of the measuring tube and/or over an entire periphery of the measuring tube.

In a seventh embodiment of the measuring tube of the invention, the measuring tube is made, at least partially, of ferromagnetic metal.

In an eighth embodiment of the measuring tube of the invention, the measuring tube is made at least partially of magnetically soft metal.

In a ninth embodiment of the measuring tube of the invention, the measuring tube is made at least partially of magnetically hard metal.

In a tenth embodiment of the measuring tube of the invention, the magnetically conductive material has a layer thickness that is much smaller than an inner diameter of the measuring tube.

In an eleventh embodiment of the measuring tube of the invention, the inner diameter of the measuring tube and the layer thickness of the magnetically conductive material are so selected that a ratio of layer thickness of the magnetically conductive material to the inner diameter of the measuring tube is smaller than 0.2, especially smaller than 0.1.

In a twelfth embodiment of the measuring tube of the invention, the measuring tube is embodied to be essentially electrically non-conductive, at least on its fluid-contacting inside.

In a thirteenth embodiment of the measuring tube of the invention, the measuring tube is formed by means of a support tube serving as outer tube wall and/or as outer encasement, especially a support tube of metal and/or an electrically conductive material, which is lined internally with at least one layer of electrically insulating material. In a further development of this embodiment of the invention, the support tube has a wall thickness, which is much smaller than an inner diameter of the support tube. Especially, in such case, the inner diameter and the wall thickness of the support tube are so selected that a ratio of the wall thickness of the support tube to its inner diameter is smaller than 0.5, especially smaller than 0.2. In another further development of this embodiment of the invention, in such case, such a magnetically conductive material is used having the ratio of the wall thickness of the support tube to its inner diameter multiplied by the relative permeability, $\mu_r$, of the magnetically conductive material yield a value which is smaller than 5, especially smaller than 3, and/or which is greater than one, especially greater than 1.2. A further aspect of this embodiment of the invention is that the support tube is manufactured at least partially, especially predominantly, or throughout, of the magnetically conductive material.

In a first embodiment of the flowmeter of the invention, such further includes a measuring and operating circuit, a magnetic field system fed from the measuring and operating circuit and producing, by means of at least one field coil arranged on the measuring tube or in its vicinity, a magnetic field, especially a pulsed magnetic field, passing, at least at times, through a lumen of the measuring tube, and at least two measuring electrodes for sensing electric potentials and/or electric voltages induced in the fluid flowing through the measuring tube and traversed by the magnetic field. For producing measured values, which represent at least one parameter describing the fluid being measured, the measuring and operating circuit is additionally connected, at least at times, with at least one of the measuring electrodes. In a further development of this embodiment of the invention, the measuring electrodes are arranged on the measuring tube and/or within its tube wall, separated from the at least one field coil. Especially, the at least two measuring electrodes are, in such case, so arranged on the measuring tube, that an electrode axis imaginarily connecting these electrodes cuts essentially perpendicularly through the magnetic field passing, at least at times, through the lumen of the measuring tube. Additionally, the magnetically conductive material is so distributed, at least in the region of a central tube segment of the measuring tube, especially along a self-closing periphery of the measuring tube, and the at least one field coil and the measuring electrodes are so arranged on the measuring tube, that the magnetic field produced, at least at times during operation, is coupled into the lumen of the measuring tube both in the region of the field coils as well as in the region of the measuring electrodes, especially with essentially equal magnetic flux density and/or with magnetic flux density in essentially the same direction. Taking this further, in such case, the magnetically conductive material is so distributed, at least in the region of a central tube segment of the measuring tube, especially along a self-closing periphery of the measuring tube, and the at least one field coil as well as the measuring electrodes, are so arranged on the measuring tube, that the magnetic field produced at least at times within the lumen of the measuring tube is developed at least in the region of the central tube segment in such a way that it is directed at least predominantly perpendicularly to the imaginary electrode axis, at least in the region of the tube wall, also in a perpendicular distance from the imaginary electrode axis of more than a quarter length of the inner diameter of the measuring tube.

In a second embodiment of the flowmeter of the invention, such further includes at last one magnetic guideback running outside of the measuring tube for guiding the magnetic field outside of the measuring tube. In a further development of this embodiment of the invention, in such case, an average separation, measured especially in the region of the measuring electrodes, between the magnetic guideback and the measuring tube is so selected, that a separation:diameter ratio of the average separation to an outer diameter of the support tube is smaller than 1, especially smaller than 0.5. Additionally, it can be of advantage in the case of this embodiment of the invention to use such a magnetically conductive material that the ratio of the average separation to the outer diameter of the outer diameter of the support tube, multiplied by the relative permeability, $\mu_r$, of the magnetically conductive material results in a value which is smaller than 100, especially smaller than 60.

Figure 2:
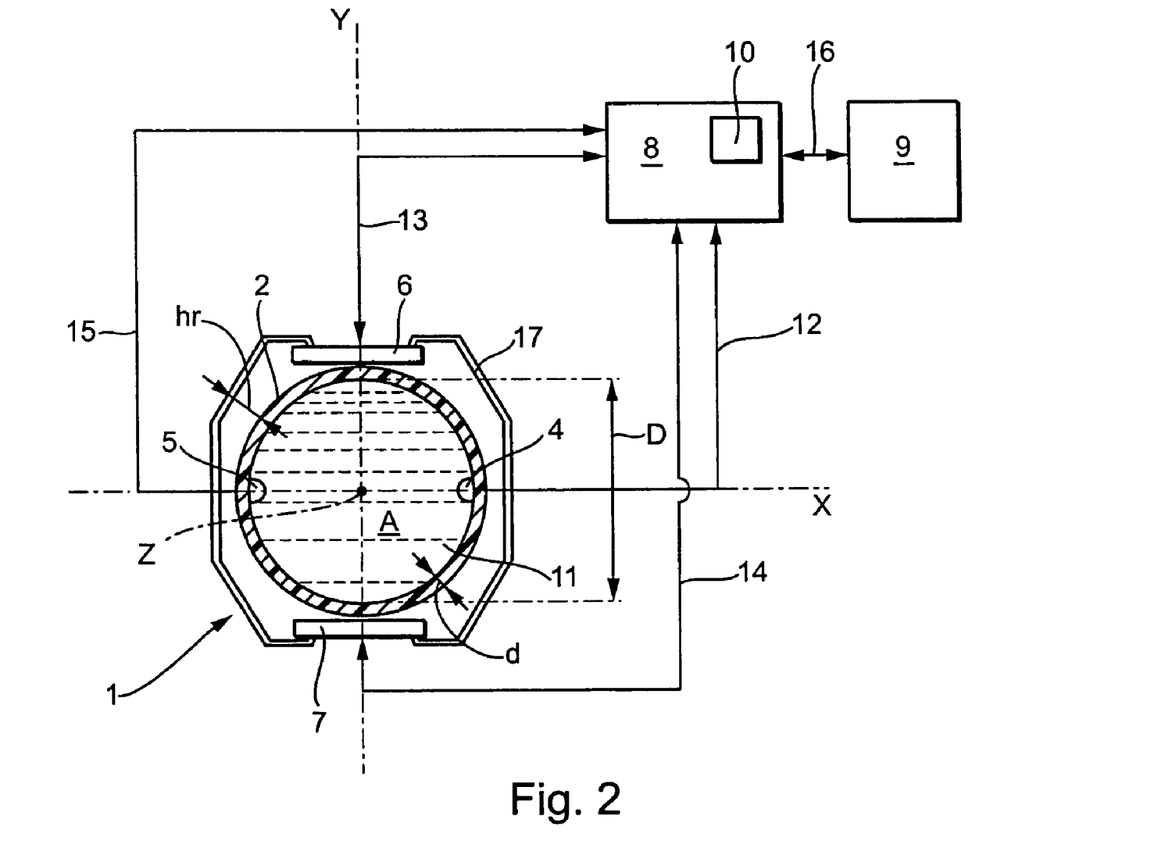
FIG. 2 schematically, partially a cross section, and partially a block diagram, of a magneto-inductive flowmeter with a measuring tube.
Figure 3:
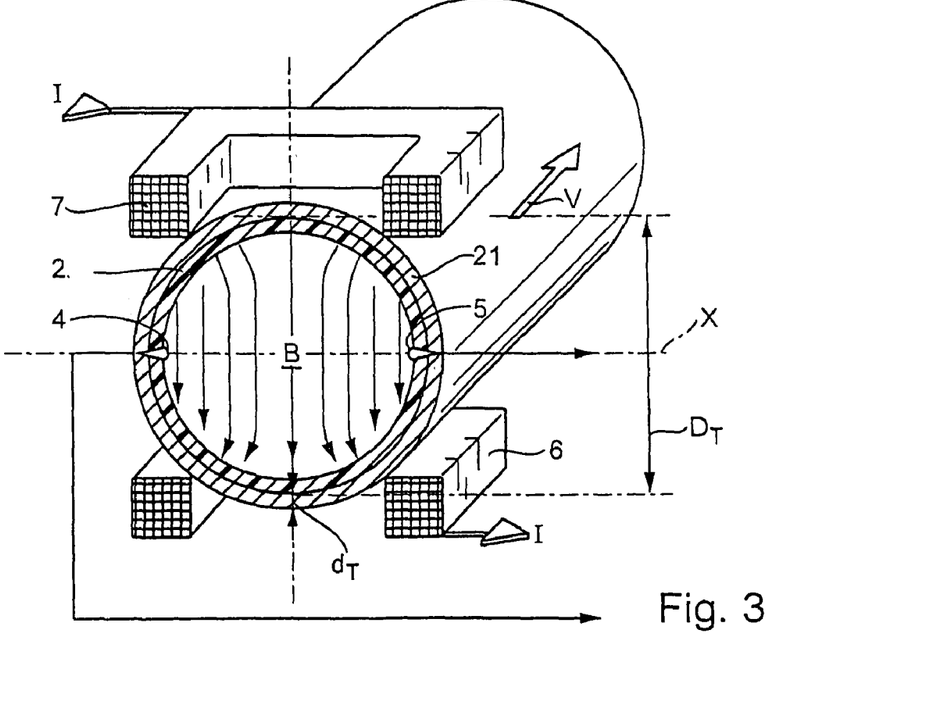
FIG. 3 in a cross section containing the electrode axis and a field coil axis, the magnetic field lines of a magneto-inductive measurement pickup of the invention.

FIGS. 2 and 3 illustrate a flowmeter schematically. With the flowmeter, at least one physical, measured variable of an electrically conducting and flowing fluid 11, for example volume flow rate, can be determined. The flowmeter includes a magneto-inductive measurement pickup 1 and a measuring and operating circuit 8 coupled therewith for actuating same and for producing measured values, especially digital measured values, representing at least one parameter describing the fluid. For the forwarding of calculated, measured values, the measuring and operating circuit 8, which is implemented, for example, also utilizing a microcomputer 10, can additionally communicate via a corresponding data transmission system 16 with a superordinated process control computer 9.

Belonging to the measurement pickup 1 is a measuring tube 2, which is inserted into the course of a pipeline (not shown) conveying the fluid 11. The measuring tube 2 includes a measuring tube lumen surrounded by a tube wall. At least at times, fluid 11 to be measured flows through the measuring tube lumen. For connecting measuring tube 2 with the pipeline, appropriate connecting elements, e.g. flanges, are provided on the ends of the measuring tube 2.

Additionally, during operation of the flowmeter, a magnetic field passes, at least at times, through at least a part of the measuring tube lumen. The magnetic field, which is kept essentially constant, at least at times, especially also rhythmically repeating, extends at least sectionally perpendicularly to a longitudinal axis z of the measuring tube coinciding with the stream direction of the fluid 11, whereby a measurement voltage U corresponding with the at least one measured variable of the fluid, for example the flow velocity and/or volume flow rate, is induced in the fluid. The measuring tube is embodied essentially electrically non-conductively on its inside contacting fluid, in order to prevent a short-circuiting of the measurement voltage U, induced by means of the magnetic field, through the measuring tube 2.

Figure 1:
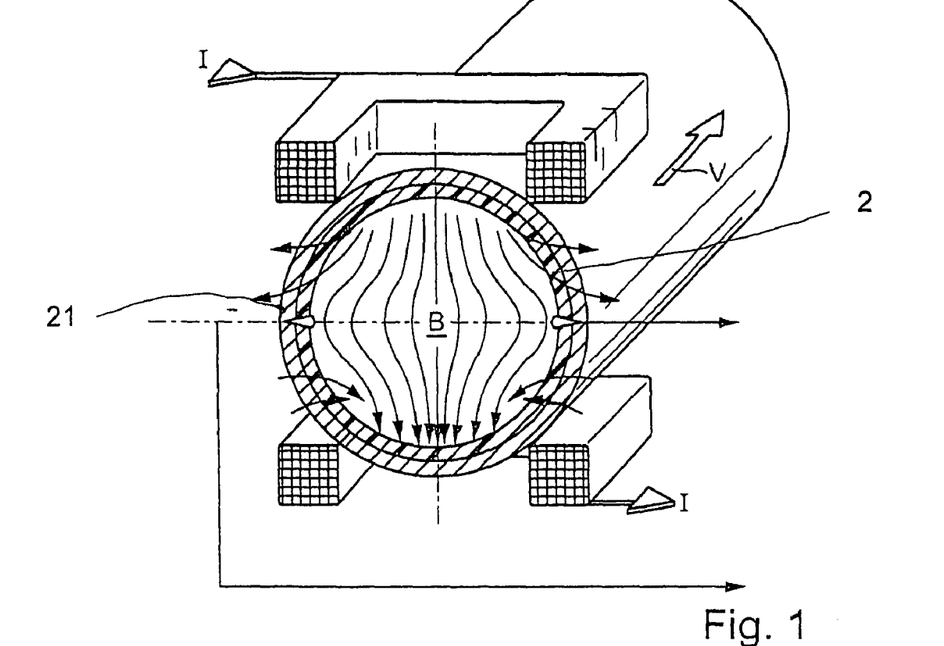
FIG. 1 the magnetic field lines in a conventional magneto-inductive measurement pickup.

For producing this magnetic field which is needed for the measuring of that at least one parameter, with a flux density B sufficiently high therefor, the measurement pickup 1 additionally has a magnetic field system fed from the measuring and operating circuit 8. The magnetic field system produces, at the least at times, by means of at least one field coil arranged on the measuring tube 2 or in its vicinity, a magnetic field, especially a pulsed, or strobed, or clocked, magnetic field, passing through the lumen of the measuring tube 2. In the example of the embodiment shown here, the magnetic field system includes a first field coil 6 and a second field coil 7, especially a second magnetic field coil 7 connected electrically in series, or even in parallel, with the first field coil 6. The field coils 6, 7 are arranged lying opposite to one another on the measuring tube 2 and, indeed, in an advantageous embodiment of the invention, such that a coil axis y virtually connecting the two field coils coincides with a diameter of the measuring tube 2 extending essentially perpendicularly to the longitudinal axis z of the measuring tube 2. The magnetic field passing through the tube wall and the measuring tube lumen arises, now, when a corresponding exciter current, for instance a pulsed direct current, or an alternating current, is caused to flow in the field coils 6, 7. Each of the field coils 6, 7 can, as is usual in the case of such magnetic field systems, be wound on a magnetically conductive core, with this, in turn, being able to interact with a corresponding pole shoe; compare e.g. U.S. Pat. No. 5,540,103. The field coils can, however, also, as schematically shown in FIG. 1, be coreless. Air coils. For improving the magnetic properties of the magnetic field system, a magnetic guideback 17 can additionally be provided arranged outside of the measuring tube 2, to serve for containing the magnetic field outside of the measuring tube within as small a volume as possible. For example, the field coils 6, 7 can, as is also usual for measurement pickups of such type, be magnetically coupled together by means of such magnetic guidebacks 17 arranged outside of the measuring tube. The magnetic field system is additionally advantageously so embodied, especially the two field coils 6, 7 are so dimensioned and oriented with respect to one another, that the magnetic field produced therewith is developed largely symmetrically, especially at least $c_2$-rotation-symmetrically ($c_2$-symmetry=180°-rotation-symmetry), at least with reference to the coil axis y, within the measuring tube 2.

For the sensing of electric potentials and/or electric voltages induced in the fluid flowing through the measuring tube 2 and through which the magnetic field passes, the measurement pickup further includes at least two measuring electrodes, which are connected during operation of the flowmeter, at least at times, with the measuring and operating circuit 8, with a measuring electrode 4 arranged on an inside of the tube wall of the measuring tube 2 serving for the sensing of a first potential depending on the at least one measured variable and a second measuring electrode 5 likewise arranged on the measuring tube serving for the sensing of a second potential also dependent on the at least one measured variable. The measuring electrodes 4, 5 are, in such case, spaced on the measuring tube from the at least one field coil and/or arranged within its tube wall, and, indeed, in an advantageous embodiment of the invention, such that an electrode axis x imaginarily connecting the two measuring electrodes 4, 5 extending essentially perpendicular to the coil axis y and/or to the measuring tube longitudinal axis z. Under the influence of the magnetic field B, free charge carriers present in the flowing fluid migrate, depending on polarity, in the direction of the one or the other of the measuring electrodes 4, 5. The measurement voltage U built-up between the measuring electrodes 4, 5 is, in such case, essentially proportional to the flow velocity of the fluid averaged over the cross section A of the measuring tube 2 shown in FIG. 1 and is, therefore, also a measure for its volume flow rate.

In the example of an embodiment shown here, the measuring electrodes 4, 5 lie, in such case, essentially on a second diameter of the measuring tube 2 which is both essentially perpendicular to the longitudinal axis z of the measuring tube and also essentially perpendicular to the coil axis y. The measuring electrodes 4, 5 can, for example, as also shown schematically in FIG. 1, be embodied as galvanic electrodes, thus electrodes contacting the liquid. Alternatively or in supplementation thereof, however, also capacitive, thus e.g. electrodes arranged within the tube wall of the measuring tube 2 can be used as measuring electrodes 4, 5. Moreover, it is of advantage, when the magnetic field system is so embodied that the magnetic field also exhibits at least a $c_2$ symmetry with respect to the electrode axis x. In an embodiment of the invention, the magnetic field is additionally so embodied that it is, within the measuring tube lumen, at least at times, essentially symmetrical with respect to the aforementioned, imaginary reference axes x, y, z, and, indeed, in the manner such that it exhibits essentially, in each case, at least a c2-symmetry (=180°-rotation symmetry).

The measuring electrodes 4, 5, as well as also the at least one field coil 6, or the field coils 6, 7, as the case may be, are finally electrically connected, via corresponding connection lines 4, 5, 6, 7, with the measuring and operating circuit 8 controlling the operation of the flow pickup.

According to the invention, it is further provided that the measuring tube is at least partly, especially predominantly, composed of a magnetically conductive material having a relative permeability $\mu_r$, which is essentially greater than one. In an embodiment of the invention, in such case, also that region of the measuring tube containing the measuring electrodes is composed of the magnetically conductive material.

Investigations have, namely, surprisingly shown, that, in the case of use of magnetically, especially highly, conductive material for the measuring tube at least in the region of a central tube segment of the measuring tube 2 cut by the imaginary field coil axis y and the imaginary electrode axis x, significant improvements at least of the stationary (thus kept sufficiently constant for the measurement of the at least one parameter) magnetic field in the measuring tube lumen can be achieved, especially with respect to its flux density B and/or its distribution and orientation in the measuring tube lumen. Thus, for example, for a cross section of the measuring tube 2 corresponding essentially to the cross section A shown in FIG. 2, as defined by the field coil axis y and the electrode axis x, it was possible to determine that the flux density B at least of the stationary magnetic field can assume, surprisingly, extra-proportionally high values in the case of a relative permeability $\mu_r$ of greater than 10. This can be verified, without more, for actual measuring tubes and magnetic field systems, among other ways, on the basis of the so-called $L^2$-norm of the flux density B. The $L^2$-Norm $\|B\|_{L2}$ of the flux density B gives, essentially, how much magnetic field is contained in this cross section A of the measuring tube, or how high the magnetic energy of the magnetic field is, and can be calculated based on the formula $$\|B\|_{L2} = \sqrt{\int_A |B|^2 \, dx\,dy} = \sqrt{\int_A |B_x|^2 + |B_y|^2 \, dx\,dy} \qquad (1)$$

Figure 4A:
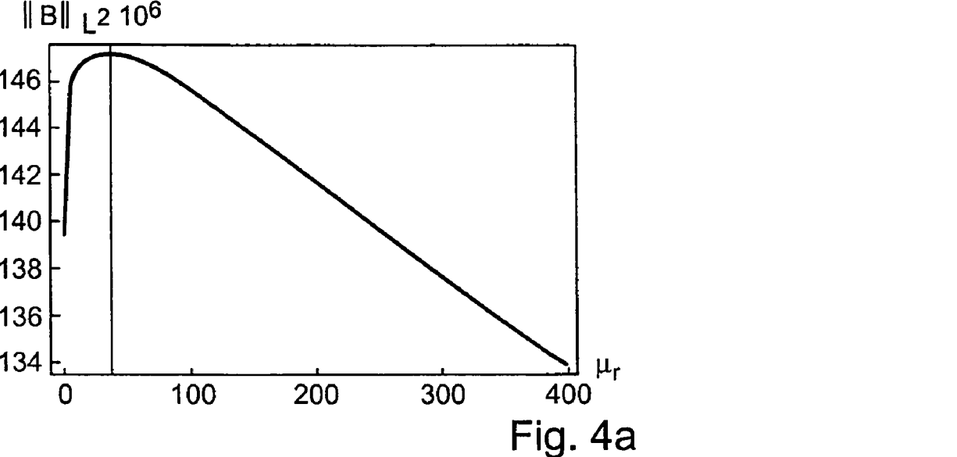
FIGS. 4a, 4b, 4c within the cross section of FIG. 3, L2-norms of the magnetic flux density B determined for various magneto-inductive measurement pickups, as well as of its components in the direction of the electrode axis and in the direction of the field coil axis, in each case as a function of a relative permeability of the measuring tube material.
Figure 5:
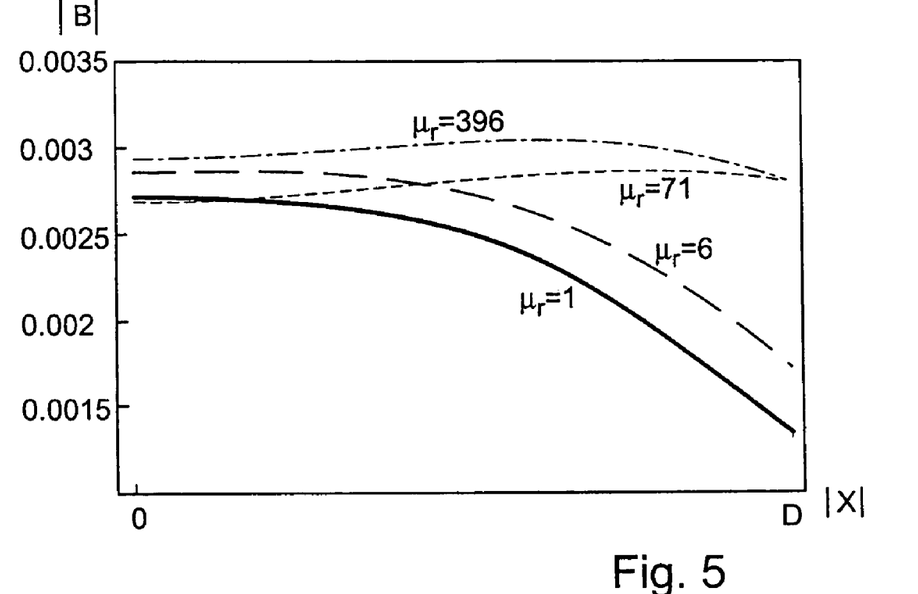
FIG. 5 within the cross section of FIG. 3, plots of magnitude of the magnetic flux density B determined for various magneto-inductive measurement pickups along their electrode axes, as a function of a separation from the midpoint of the electrode axis.

A possible plot of the $L^2$-Norm $\|B\|_{L2}$ of the flux density B as a function of the selected relative permeability $\mu_r$ is shown by way of example in FIG. 4a. Accompanying this improvement of the magnetic field in the entire measuring tube lumen based on the use of magnetically highly conductive material, also a significant increase at least in the magnitude |B| of the flux density B can be noticed, be it in the region of the aforementioned tube segment, especially within the aforementioned cross section A of the measuring tube, or, as illustrated by way of example in FIG. 5, at least along the electrode axis x and in its immediate vicinity. As a result of this elevating of the flux density B, an equally significant increasing of the measurement voltage U in comparison to conventional magneto-inductive flow meters of comparable construction can be observed.

Furthermore, it has been found that, as a function of the actual dimensions of the measuring tube and magnetic field system, including possible guidebacks, there can be found for the measuring tube an optimal relative permeability $\mu_r$, at which, in the case of a stationary magnetic field, the flux density B and, to such extent, also its $L^2$-Norm $\|B\|_{L2}$ is maximum; compare, in this connection, also FIG. 4a. In corresponding manner, the measurement pickup has a maximum sensitivity, at which the flowing fluid containing the magnetic field passing through it effects a maximum measured voltage U between the two measuring electrodes. Further investigations in this regard led to the discovery that the optimal relative permeability $\mu_r$, depending on dimensions of the measurement pickup, lie about in the range between 10 and 1000, especially in the range between 20 and 400.

It has further been determined that, by the use of magnetically conductive material for the measuring tube, the stationary magnetic field can not only be improved with respect to its flux density B, but also in the respect that it experiences a clearly more uniform and straighter orientation in the direction of the field coil axis y in comparison to conventional measurement pickups of equal kind of construction, at least within the aforementioned cross section A, as symbolized by the essentially parallelly extending field lines drawn within the measuring tube lumen in FIG. 3. This manifests itself in, among other aspects, also by the fact that the magnetic field is coupled into the measuring tube lumen, at least within the mentioned cross section A essentially both in the region of the field coils and also in the region of the measuring electrodes, especially with the same direction and/or essentially equal magnetic flux density B. In other words, shunting of the magnetic field around the flow region relevant for the measurement can be avoided, or, at least, very effectively minimized.

Especially, it could, in such case, be determined, that, by suitable choice and distribution of the magnetically highly conductive material, matched to the nominal diameter and/or wall thickness actually selected for the measuring tube, at least the components $B_y$ of the magnetic field acting in the direction of the coil axis y can be increased, at least in the region of the central tube segment of the measuring tube, especially within the aforementioned cross section A, while, at the same time, a lessening of the components $B_x$ of the magnetic field acting in the direction of the electrode axis x is achievable.

These effects can, in turn, be verified very visibly on the basis of the respective $L^2$-norms $\|B_x\|_{L2}$ and $\|B_y\|_{L2}$ of the individual components $B_x$ and $B_y$ of the flux density, mathematically expressed by:

$$\|B_x\|_{L2} = \sqrt{\int_A |B_x|^2 \, dx\, dy} \tag{2}$$

$$\|B_y\|_{L2} = \sqrt{\int_A |B_y|^2 \, dx\, dy}. \tag{3}$$

Figure 4B:
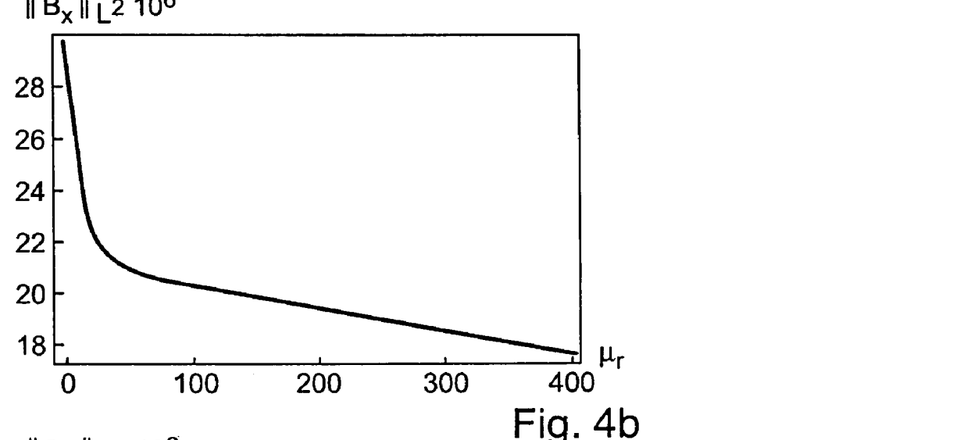
Figure 4C:
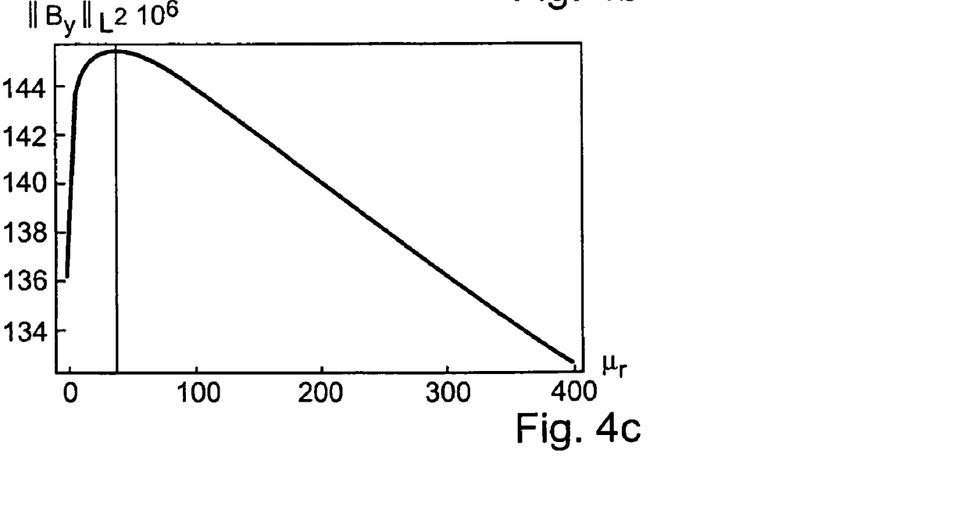

Possible plots of the $L^2$-norm $\|B_y\|_{L2}$ of the magnetic field components $B_y$, actually required for measuring at least the volume flow rate, as well as of the $L^2$-norm $\|B_x\|_{L2}$ of the magnetic field components $B_x$, for example, actually undesired for measuring the volume flow rate, are, respectively, presented, by way of example, in FIGS. 4b and 4c as functions of selected relative permeability $\mu_r$. Clearly recognizable are the initially positively, and very steeply, extending rise of the magnetic field components $B_y$ acting in the direction of the coil axis, eventually reaching a maximum value, with simultaneously very steeply falling course of the magnetic field components $B_x$ acting in the direction of the electrode axis.

Figure 6:
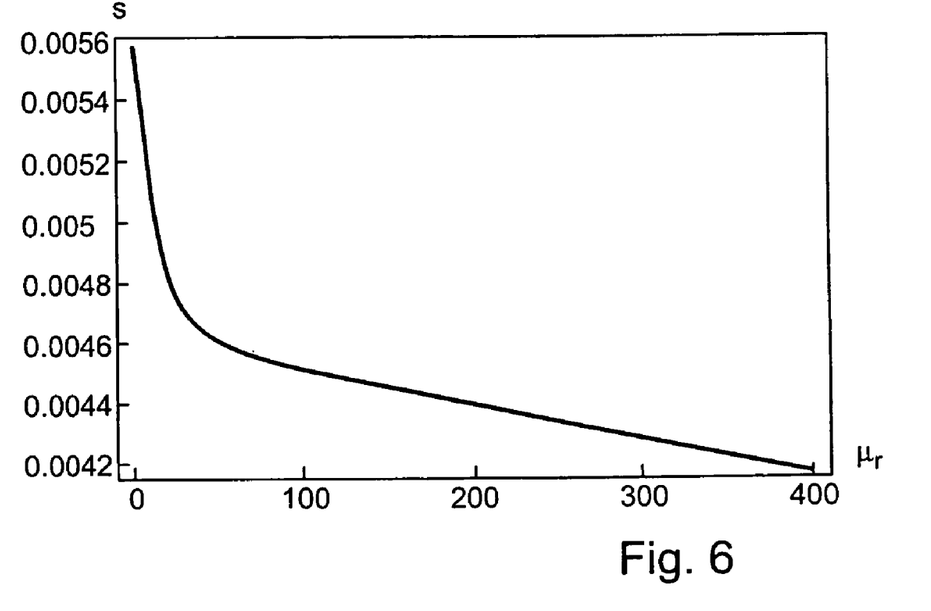
FIG. 6 within the cross section of FIG. 3, for various magneto-inductive measurement pickups, total deviations of flux density magnitude from the average value of flux density B measured there, as a function of a relative permeability of the measuring tube material.

Moreover, the magnetic field can, by the use of magnetically highly conducting materials for the measuring tube, also be considerably improved as regards its homogeneity. This is evident, for example, in the fact that a deviation of the magnitude |B| of the flux density B within the measuring tube lumen, at least, however, within the cross section A, from the average value $\overline{B}$ of the flux density B measured there, thus, essentially, a variance of the magnitude |B| of the flux density B, becomes smaller, the greater the relative permeability $\mu_r$ selected for the magnetically conductive material and, thus, for the measuring tube itself. The average value $\overline{B}$ of the flux density B, as well as also a corresponding total deviation s, can easily be determined for the cross section A, for example, based on the following mathematical relationships:

$$s = \sqrt{\int_A (|B| - \overline{B})^2 \, dx\, dy} \tag{4}$$

$$\overline{B} = \frac{1}{A} \int_A |B| \, dx\, dy, \tag{5}$$

wherein the total deviation s can exhibit, at least qualitatively, the dependence on the relative permeability $\mu_r$ shown, by way of example, in FIG. 6.

This equalizing and, to such extent, also the homogenizing of the magnetic field can be made very visible by means of a relative deviation $\tilde{s}$ of the flux density B in the cross section A from its average value $\overline{B}$ there, wherein the relative deviation $\tilde{s}$ can be calculated on the basis of the following mathematical relationship:

$$\tilde{s} = \sqrt{\int_A \left(\frac{|B|}{\overline{B}} - 1\right)^2 dx\, dy}. \tag{6}$$

Especially, by a suitable distribution of the magnetically conductive material over the measuring tube, it is possible, without more, to achieve that the stationary magnetic field is developed in such a manner that the instantaneous total deviation s of the flux density B averaged over the cross section A from the instantaneous average value $\overline{B}$ of the flux density B in the same cross section A, or also its variance, is smaller than 0.005 and/or that the corresponding relative deviation $\tilde{s}$ of the flux density B from the average value $\overline{B}$ is smaller than 1%, especially smaller than 20%, in cross section A. Additionally, by the use of magnetically highly conductive material for the measuring tube, the magnetic field can be so developed that it also perpendicularly intersects a secant of section A extending parallel to the imaginary electrode axis x and spaced from the imaginary electrode axis x a quarter length of an inner diameter of the measuring tube D.

In result, the above-described equalizing of the magnetic field and/or equalizing of the magnitude |B| of the flux density leads—thus, to such extent, the homogenizing of the magnetic field—to, among other things, also that the measurement voltage U reacts less sensitively to possible disturbances of the fluid flow, for example from entrained foreign materials, entrained gases and/or changes in the flow profile, and, to such extent, is very robust, in comparison to conventional magneto-inductive measurement pickups of similar construction. Equally, in this way, an improvement of the properties of the magnetic field relevant for the measuring of the at least one physical, measured variable, especially an increase of the flux density B in the region of the electrodes 4, 5 and the electrode axis x, as well as also within the central tube segment, can be achieved. As a result of this, the magnetic field system exhibits a higher efficiency and the measured values corresponding to the measurement voltage U, for example the flow velocity and/or the volume flow rate, can be determined more precisely.

In an embodiment of the invention, the magnetically conductive material is distributed at least over a region of a central tube segment of the measuring tube 2, in which also the electrodes and the at least one field coil are arranged. Alternatively or in supplementation thereof, the magnetically conductive material, in a further embodiment of the invention, is distributed, especially also uniformly, at least along a self-closing perimeter of the measuring tube 2 and/or over an entire length of the measuring tube 2. Additionally, the magnetically conductive material can, in such case, however, also be distributed over the entire measuring tube 2, be it now largely homogeneously or essentially heterogeneously.

In a further embodiment of the invention, it is provided that the magnetically conductive material is applied as an essentially coherent layer in the measuring tube. Preferably, the magnetically conductive material has, in such case, a layer thickness d, which is much smaller than an inner diameter D of the measuring tube. Alternatively or in supplementation thereof, the inner diameter D of the measuring tube 2 and the layer thickness d of the magnetically conductive material are so selected, that a ratio of layer thickness of the magnetically conductive material to the inner diameter D of the measuring tube is smaller than 0.2, especially smaller than 0.1.

For preventing increased eddy current and/or increased hysteresis losses in the measuring tube 2, it can, moreover, be built-up of alternatingly, especially coaxially, superimposed layers of magnetically conductive material and electrically magnetically non-conducting material. In a further development of the invention, therefore, it is provided that at least one layer, especially, however, a plurality of radially mutually separated layers, of the magnetically conductive material is/are embedded into an electrically essentially non-conducting material and/or at least one layer, especially, however, a plurality of mutually separated layers, of electrically essentially non-conducting material is/are embedded into magnetically conductive material. Moreover, in connection with the measurement pickup of the invention, if required, however, also further measures for minimizing eddy currents can be used, for example the methods disclosed in EP-A 1 460 394, and/or U.S. Pat. No. 6,031,740 for controlling the exciter current driving the magnetic-field system.

In the example of an embodiment shown here, the measuring tube 2 is, as quite usual in the case of measurement pickups of the described kind, formed by means of a support tube 21, especially a metal and/or magnetically conductive support tube 21, serving as outer tube wall and/or as outer encasement. Support tube 21 is coated internally with at least one layer 22 of electrically insulating material, such as e.g. ceramic, hard rubber, polyfluoroethylene, polyurethane or the like, to form the so-called liner; in the case of measuring tubes made completely of a relatively non-conducting plastic or a ceramic, especially a aluminum oxide ceramic, such an additional, electrically non-conducting layer is, in contrast, not absolutely necessary. In an embodiment of the invention, the support tube is made at least partially of the magnetically conductive material, especially a magnetically conductive metal.

The support tube 21 has, as also shown schematically in FIGS. 2 and 3, a wall thickness $d_T$, which, at least in comparison to the inner diameter $D_T$ of the support tube, is much smaller. In a further embodiment of the invention, it is additionally provided that the inner diameter $D_T$ and the wall thickness d of the support tube are so selected that a diameter:wall-thickness ratio $w=d_T/D_T$ of the wall thickness $d_T$ of the support tube to its inner diameter $D_T$ is smaller than 0.5, especially smaller than 0.2. In a further embodiment of the invention, such a magnetically conductive material for the support tube 21 is used and its wall thickness $d_T$ and inner diameter $D_T$ are so selected, that the aforementioned diameter:wall-thickness ratio w multiplied by the relative permeability $\mu_r$ of the magnetically conductive material gives a value $d_T/D_T \cdot \mu_r$ which is smaller than 5, especially smaller than 3. Alternatively or in supplementation thereof, such a magnetically conductive material for the support tube is used, and its wall thickness $d_T$ and inner diameter $D_T$ are so selected, that this wall-thickness form-factor $d_T/D_T \cdot \mu_r$ formed by means of the diameter:wall-thickness ratio w and the relative permeability $\mu_r$ of the magnetically conductive material for the support tube, and, to such extent, also for the entire measuring tube, assumes a value, which is greater than one, especially greater than 1.2.

Further investigations have additionally shown, that, besides the wall thickness $d_T$ and the inner diameter $D_T$ of the magnetically conductive support tube, also the geometry and/or the spatial arrangement of the magnetic guideback 17 serving for guiding the magnetic field outside of the measuring tube can have a significant influence on the course of the magnetic field within the measuring tube lumen, especially, however, on the spatial distribution of the flux density B and/or its magnitude within the cross section A and/or measuring tube lumen. Especially, it was possible to determine, in this connection, that, for example for a support tube, in which the wall thickness $d_T$, the inner diameter $D_T$, and the relative permeability $\mu_r$ are predetermined, for as uniform a distribution of the flux density B over the cross section A, at least in the region of the measuring electrodes, an optimal average separation $h_r$ between the magnetic guideback 17 and the support tube can be determined. Conversely, in turn, for the case in which wall thickness $d_T$, inner diameter $D_T$ and lateral installed dimensions for the measurement pickup are predetermined or limited, a relative permeability $\mu_r$ optimal for the best possible uniformity of the magnetic field can be determined. In another embodiment, the support tube and the guideback are, therefore, so directed and so selected that a separation:diameter ratio $w_r=h_r/(d_T+D_T)$ of the average separation $h_r$ to an outer diameter $(d_T+D_T)$ of the support tube is smaller than one, especially smaller than 0.5. In a further embodiment of the invention, such a magnetically conductive material is used for the support tube, and its wall thickness $d_T$ and inner diameter $D_T$ are so selected, that the aforementioned separation:diameter ratio $w_r$ multiplied by the relative permeability $\mu_r$ of the magnetically conductive material yields a value $\mu_r \cdot h_r/(d_T+D_T)$, which is smaller than 100, especially smaller than 60. Alternatively or in supplementation thereof, it is provided that such a magnetically conductive material is used for the support tube, and its wall thickness $d_T$ and inner diameter $D_T$ are so selected, that the guideback form-factor $\mu_r \cdot h_r/(d_T+D_T)$ for the support tube and, to such extent, also for the entire measuring tube, formed by means of the separation:diameter ratio $w_r$ and the relative permeability $\mu_r$ of the magnetically conductive material, assumes a value which is greater than one.

Figure 7:
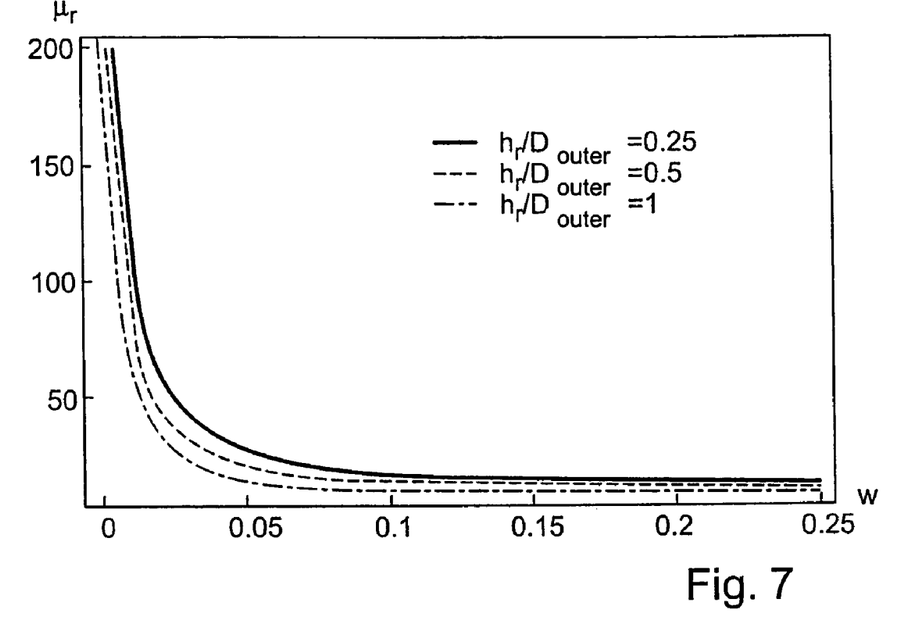
FIGS. 7, 8 dependencies of an optimal relative permeability for the measuring tube material, determined for various magneto-inductive measurement pickups according to FIG. 2 or FIG. 3, as a function of different geometric dimensioning parameters for the measurement pickups.
Figure 8:
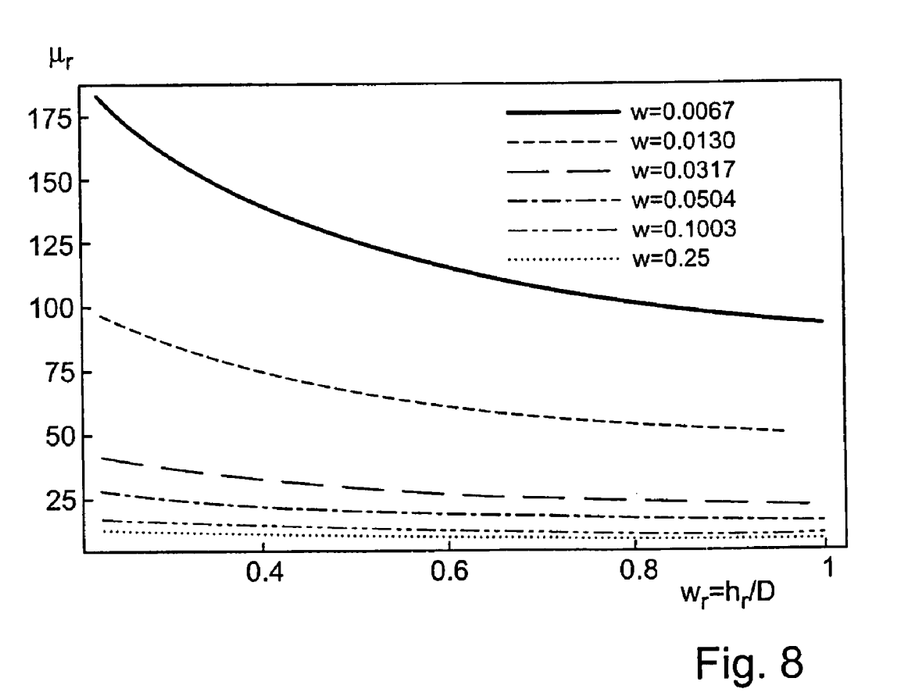

The optimal relative permeability $\mu_r$ of the magnetically conductive material used for the measuring tube in the case of a concrete configuration of the measuring tube and the magnetic field system for obtaining a maximum measurement voltage U can, for practically relevant diameter:wall-thickness ratio w and/or practically relevant distance:diameter ratio $w_r$, be directly read from the empirically determined sets of characteristic curves shown in FIGS. 7 and 8.

Figure 9:
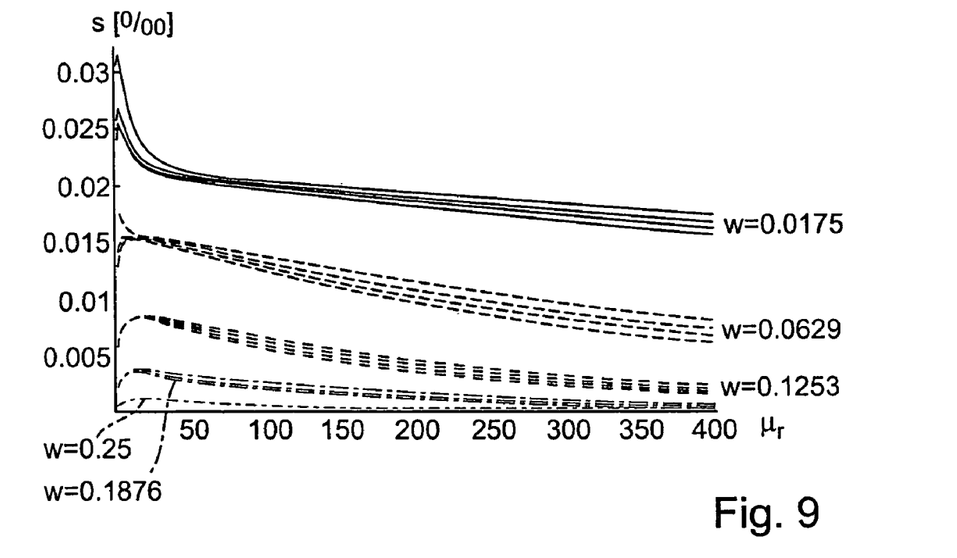
FIGS. 9, 10, 11a, 11b, 11c, 12a, 12b, 12c dependencies of the magnetic field within the cross section of FIG. 3 on the basis of measured variables characterizing the magnetic field therewithin, for various magneto-inductive measurement pickups according to FIG. 2 or FIG. 3, as a function of the relative permeability of the measuring tube material and various geometric dimensioning parameters of the measurement pickup.
Figure 10:
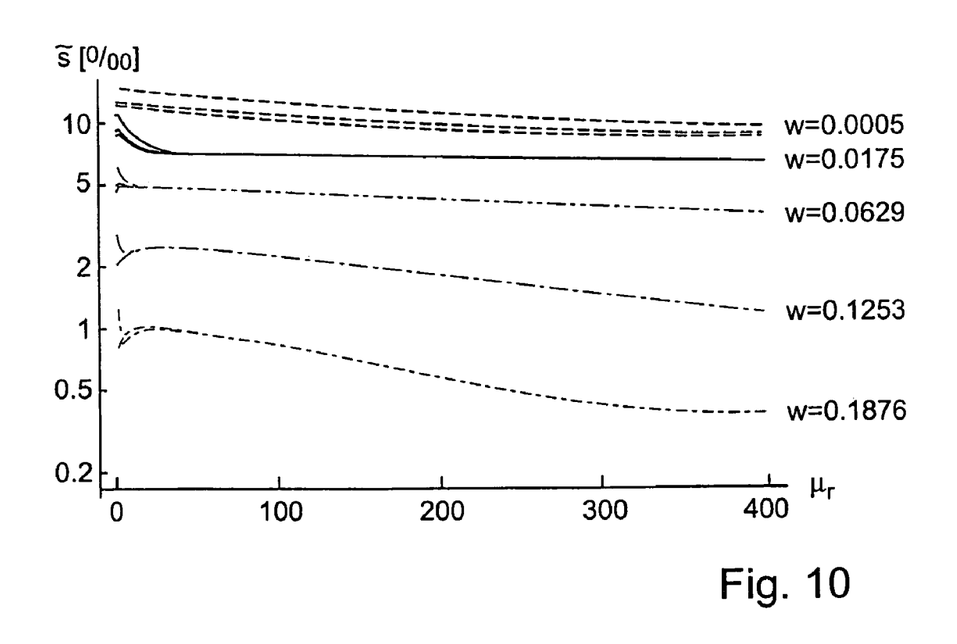

Although, as indicated above using the example of the guideback form-factor $\mu_r \cdot h_r/(d_T+D_T)$, also the dimensioning of the guideback can, by all means, influence the spreading of the magnetic field, especially the distribution of the flux density B within the cross section A, it was possible, surprisingly, to determine, that the inner diameter and the wall thickness of the support tube, or, more generally, the inner diameter D of the measuring tube and the distribution, especially the layer thickness, of the magnetically conductive material in the measuring tube, can have, in this regard, a much greater influence on the spreading of the magnetic field within the measuring tube lumen, and, to this extent, also on the development and the robustness of the measurement voltage U. Therefore, in FIG. 9, curves for the above total deviation s from the average value $\overline{B}$, and, in FIG. 10, for the relative deviation $\tilde{s}$ from the average value $\overline{B}$, are shown. These curves were empirically determined for different diameter:wall-thickness ratios w and different separation:diameter ratios $w_r$ in the region of the cross section A. In these FIGS. 9 and 10, for each of the here selected diameter:wall-thickness ratios w (0.0005 . . . 0.1876), in each case, the same four different separation:diameter ratios $w_r$ (0.25; 0.5; 0.75; 1) were investigated and the data plotted for the different diameter:wall-thickness ratios w according to line styles as follows: w=0.0175-; w=0.0629: --; w=0.1253: --; w=0.1876: -•-; w=0.25: -•-. Clearly recognizable is the fact that, for practically relevant diameter:wall-thickness ratios w of greater than 0.01, on the one hand, in the case of sufficiently large, selected, relative permeability $\mu_r$ of greater than, or equal to, 10, there is scarcely any detectable influence of the guideback on the relative deviation $\tilde{s}$ and, to such extent, on the shape of the magnetic field within the cross section A. On the other hand, for said wall-thickness ratios w of greater than 0.01, in the case of a sufficiently great, selected relative permeability $\mu_r$ of greater than, or equal to, 10, only marginal improvements of the magnetic field can be obtained, as regards an at least magnitudinally uniform distribution of the flux density B within the cross section A.

Figure 11A:
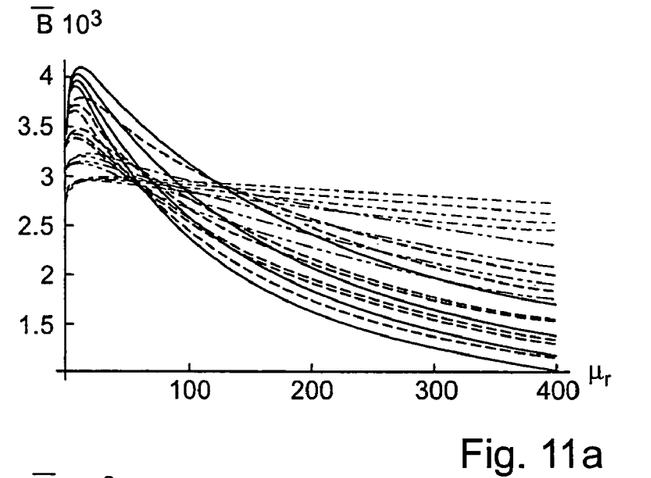
Figure 11B:
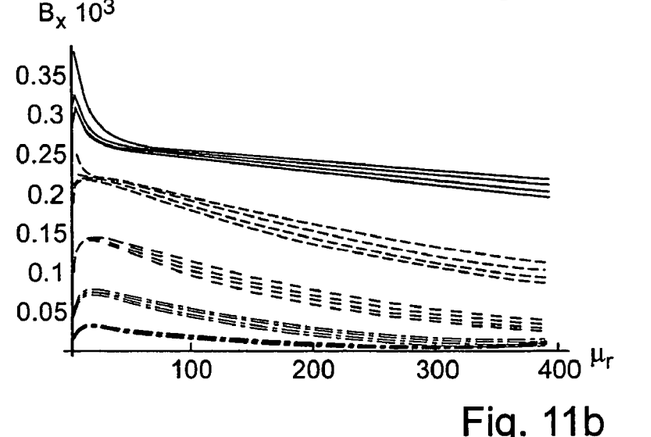
Figure 11C:
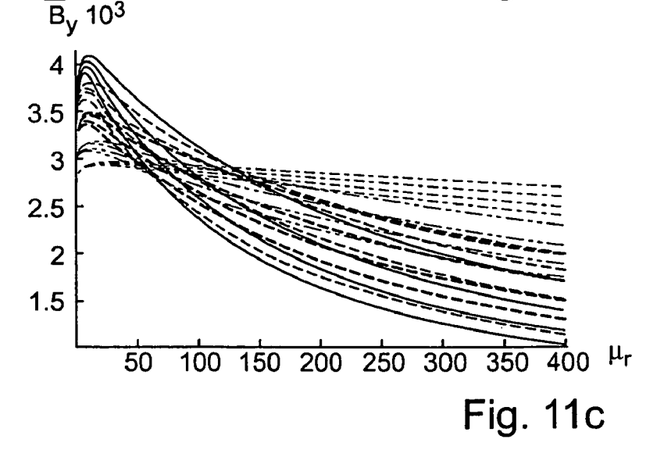
Figure 12A:
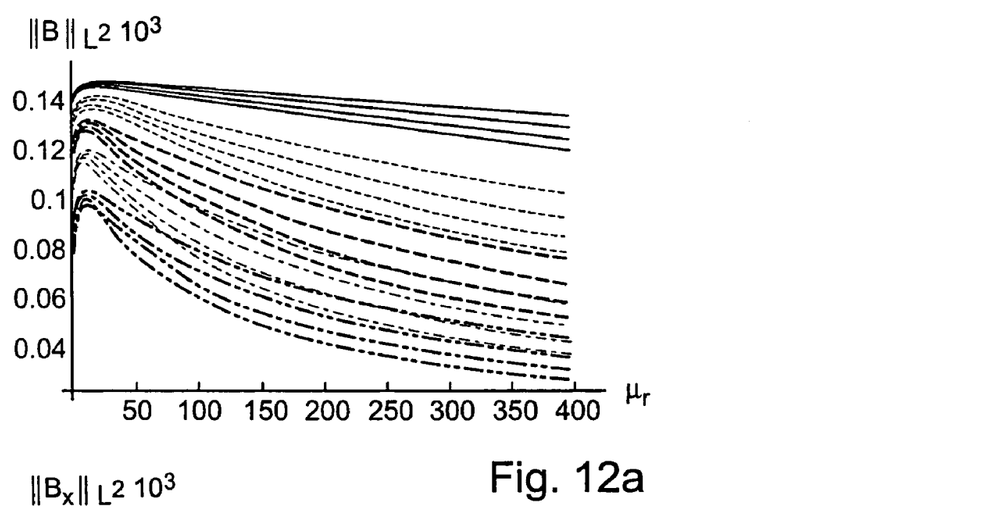
Figure 12B:
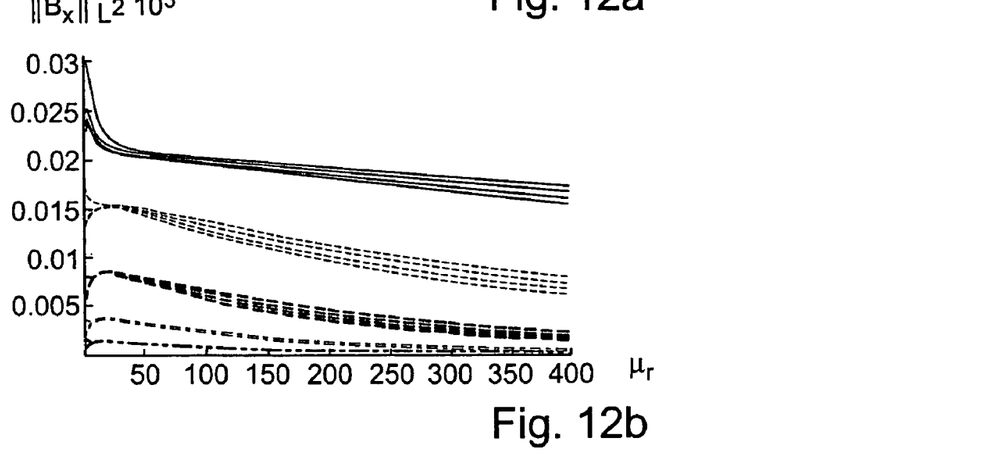
Figure 12C:
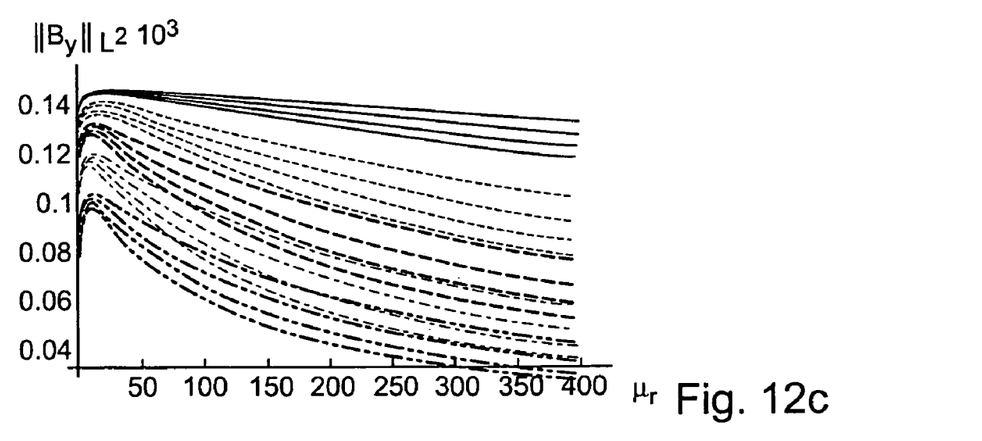

Moreover, it can be seen from the curves presented in FIGS. 11a, b, c and 12a, b, c for the average values and the $L^2$-norms, which, in each case, were determined numerically depending on the aforementioned ratios w and a both for the flux density as well as for their individual components $B_x$ and $B_y$, that, by the use of magnetically highly conductive material for the measuring tube, at least for relative permeabilities $\mu_r$ in the range between 10 and 50, it is possible to achieve, in addition to the reduction of the component of the magnetic field acting in the direction of the electrode axis x, also an increase of the magnetic energy at least within the cross section A and, to such extend, also an increase in the efficiency of the magnetic field system.

It is to be noted here that the magnetically conductive material for implementing the invention can be structural steel, cast iron or also a composite material and/or plastic doped, for example by dispersion, with magnetically conductive particles; of course, however, also other materials magnetically conductive in the sense of the invention can serve as material for the measuring tube, for example also such materials as have been, or are, used conventionally for coil cores and/or magnetic guideback. In an embodiment of the invention, it is, accordingly, provided, that the measuring tube, especially also the above mentioned support tube, is manufactured at least partially of ferromagnetic metal. In such case, the measuring tube, especially also the above mentioned support tube, can be made at least partially of soft magnetic metal and/or at least partially of hard magnetic metal.

As can be perceived without difficulty from the above explanations, the measurement pickup of the invention is distinguished by a multitude of degrees of freedom, which make possible for those skilled in the art, especially also still according to a specification of outer and/or inner installed measurements (nominal diameter, installation length, lateral spacing, etc.), by choice of a correspondingly suited material for the measuring tube, to achieve an optimizing of the magnetic field and, therefore, for example, an improvement of the sensitivity of the measurement voltage U to the parameters to be measured for the fluid, as well as of its robustness in the face of possible disturbances in the fluid. With knowledge of the invention and on the basis of the background of the above-referenced state of the art, there is no difficulty for those skilled in the art to determine the measuring tube materials suited for any particular application.

The invention claimed is:

1. A measuring tube to serve for the conveying of an electrically conductive fluid in a magneto-inductive flowmeter, said measuring tube being composed, at least partially, of a magnetically conductive material having a relative permeability, which is greater than 10,
   at least one field coil arranged outside on the measuring tube or in the vicinity thereof; and
   at least two measuring electrodes are arranged on an inside of the tube wall of the measuring tube, the region of the measuring tube containing said at least two measuring electrodes is composed of the magnetically conductive material, wherein:
   a central tube segment of the measuring tube is composed, along a self-closing periphery of the measuring tube, of said magnetically conductive material; and/or
   said magnetically conductive material is distributed essentially over an entire length of the measuring tube; and/or
   said magnetically conductive material is distributed essentially over an entire periphery of the measuring tube.

2. The measuring tube as claimed in claim 1, wherein: the magnetically conductive material has a relative permeability, which is greater than 20.

3. The measuring tube as claimed in claim 1, wherein: the magnetically conductive material has a relative permeability, which is smaller than 1000.

4. The measuring tube as claimed in claim 1, wherein: the magnetically conductive material has a relative permeability, which lies in a range between 20 and 400.

5. The measuring tube as claimed in claim 1, wherein: said measuring tube is composed at least partially of ferromagnetic metal.

6. The measuring tube as claimed in claim 5, wherein: said measuring tube is composed at least partially of soft magnetic metal.

7. The measuring tube as claimed in claim 5, wherein:
said measuring tube is composed at least partially of hard magnetic metal.

8. The measuring tube as claimed in claim 1, wherein:
said magnetically conductive material has a layer thickness (d), which is much smaller than an inner diameter (D) of said measuring tube.

9. The measuring tube as claimed in claim 1, wherein:
the inner diameter of said measuring tube and the layer thickness of the magnetically conductive material are so selected, that a ratio of layer thickness of said magnetically conductive material to the inner diameter of said measuring tube is smaller than 0.2.

10. The measuring tube as claimed in claim 1, wherein:
said measuring tube is embodied essentially electrically non-conductingly on its inside contacting fluid.

11. The measuring tube as claimed in claim 1, wherein:
its components of metal are predominantly of magnetically conductive material.

12. The measuring tube as claimed in claim 1, wherein:
the measuring tube is composed predominantly of said magnetically conductive material having a relative permeability, which is smaller than 400.

13. A measuring tube and support tube combination serving for the conveying of an electrically conductive fluid in a magneto-inductive flowmeter, said measuring tube being formed by means of said support tube, serving as an outer tube wall and/or an as outer encasement made, at least partially of a magnetically conductive material having a relative permeability, greater than 1, and lined internally by at least one layer of an electrically insulating material;
said support tube has a wall thickness, smaller than an inner diameter, of said support tube, wherein:
the inner diameter of said support tube and the wall thickness of said support tube are selected, that a ratio, of said wall thickness to said inner diameter of the support tube is smaller than 0.5; and
such magnetically conductive material is used, that said ratio, of the wall thickness of said support tube to its inner diameter multiplied by the relative permeability, of the magnetically conductive material gives a value, which is greater than 1.

14. The measuring tube as claimed in claim 13, wherein:
said support tube is made, at least partially of the magnetically conductive material.

15. The measuring tube as claimed in claim 14, wherein:
said support tube is made predominantly of metal.

16. The measuring tube as claimed in claim 13, wherein:
said support tube serves as an outer tube wall and/or as an outer encasement of the measuring tube.

17. The measuring tube as claimed in claim 13, wherein:
the inner diameter and the wall thickness of said support tube are so selected, that a ratio of the wall thickness of said support tube to its inner diameter is smaller than 0.2.

18. The measuring tube as claimed in claim 13, wherein:
such a magnetically conductive material is used, that said ratio of the wall thickness of said support tube to its inner diameter multiplied by the relative permeability of the magnetically conductive material gives a value which is smaller than 5.

19. The measuring tube as claimed in claim 13, wherein:
such a magnetically conductive material is used, that said ratio of the wall thickness of said support tube to its inner diameter multiplied by the relative permeability of the magnetically conductive material yields a value which is greater than and/or that said ratio of the wall thickness of said support tube to its inner diameter multiplied by the relative permeability of the magnetically conductive material yields a value which is smaller than 3.

20. A magneto-inductive flowmeter for a fluid flowing in a line, said flowmeter comprising:
a measuring tube composed, at least partially, of a magnetically conductive material having a relative permeability, which is greater than 10;
a measuring and operating circuit,
a magnetic field system fed by the measuring and operating circuit, said magnetic field system producing, by means of at least one field coil arranged outside on the measuring tube or in the vicinity thereof, a magnetic field passing, at least at times, through a lumen of the measuring tube; and
at least two measuring electrodes for sensing electric potentials and/or electric voltages induced in the fluid flowing through the measuring tube and passed-through by the magnetic field, said measuring electrodes being arranged on said measuring tube and/or within a wall of said measuring tube, spaced from the at least one field coil; wherein:
said magnetically conductive material is so distributed, at least in said region of a central tube segment of said measuring tube, as well as the at least one field coil and said measuring electrodes are so arranged on said measuring tube, that the magnetic field produced at least at times during operation is coupled into the lumen of said measuring tube both in the region of said field coils and also in the region of said measuring electrodes with essentially the same direction and/or with essentially equal magnetic flux density; and
said measuring and operating circuit is connected, at least at times, with at least one of the measuring electrodes for producing measured values representing at least one parameter describing the fluid.

21. The magneto-inductive flowmeter as claimed in claim 20, wherein:
said central tube segment of said measuring tube is composed, along a self-closing periphery of the measuring tube, of said magnetically conductive material; and/or said magnetically conductive material is distributed essentially over an entire length of said measuring tube; and/or
said magnetically conductive material is distributed essentially over an entire periphery of said measuring tube.

22. The magneto-inductive flowmeter as claimed in claim 21, wherein:
said measuring electrodes are arranged on said measuring tube and/or within its tube wall, spaced from the at least one field coil,
said measuring tube being formed by means of a support tube made, at least partially of a magnetically conductive material having a relative permeability, greater than 1, and lined internally by at least one layer of an electrically insulating material; said support tube has a wall thickness, smaller than an inner diameter, of said support tube;
the inner diameter of said support tube and the wall thickness of said support tube are selected, that a ratio, of said wall thickness to said inner diameter of the support tube is smaller than 0.5, and such magnetically conductive material is used, that said ratio, of the wall thickness of said support tube to its inner diameter multiplied by the relative permeability, of the magnetically conductive material gives a value, which is greater than 1.

23. The magneto-inductive flowmeter as claimed in claim 22, wherein:
said magnetically conductive material is, such that said ratio of the wall thickness of said support tube to its inner diameter multiplied by the relative permeability of the magnetically conductive material gives a value which is smaller than 5.

24. The magneto-inductive flowmeter as claimed in claim 23, wherein:
said at least two measuring electrodes are so arranged on said measuring tube that an electrode axis imaginarily connecting such intersects the magnetic field passing at least at times through the lumen of said measuring tube essentially perpendicularly.

25. The magneto-inductive flowmeter as claimed in claim 24, wherein:
the magnetically conductive material is so distributed, at least in the region of a central tube segment of said measuring tube, preferably along a self-closing periphery of said measuring tube, and the at least one field coil and said measuring electrodes are so arranged on said measuring tube, that the magnetic field produced at least at times is developed within the lumen of said measuring tube at least in the region of said central tube segment in such a manner that it is oriented at least predominantly perpendicularly to the imaginary electrode axis, at least in the region of the tube wall also in a perpendicular distance from the imaginary electrode axis of more than a quarter length of an inner diameter (D) of said measuring tube.

26. The magneto-inductive flowmeter as claimed in claim 23, wherein:
said magnetically conductive material is such that said ratio of the wall thickness of said support tube to its inner diameter multiplied by the relative permeability of the magnetically conductive material gives a value which is greater than 1.2.

27. The magneto-inductive flowmeter as claimed in claim 20, wherein:
the measuring tube is composed predominantly of said magnetically conductive material having a relative permeability, which is smaller than 1000.

28. The magneto-inductive flowmeter for a fluid flowing in a line, said flowmeter comprising:
a measuring tube composed, at least partially of a magnetically conductive material having a relative permeability, which is greater than 1;
a measuring and operating circuit,
a magnetic field system fed by the measuring and operating circuit, said magnetic field system producing, by means of at least one field coil arranged outside on the measuring tube or in the vicinity thereof, a magnetic field passing, at least at times, through a lumen of the measuring tube; and
at least one magnetic guideback running outside of said measuring tube for guiding the magnetic field outside of said measuring tube, wherein
an average separation, between said magnetic guideback and said measuring tube is so selected, that a separation to diameter ratio, of the average separation, to an outer diameter, of said support tube is smaller than one.

29. The magneto-inductive flow meter as claimed in claim 28, wherein:
an average separation between said magnetic guideback and said measuring tube is so selected, that a separation: diameter ratio of the average separation to an outer diameter of said support tube is smaller than than 0.5.

30. The magneto-inductive flowmeter as claimed in claim 29, wherein:
said magnetically conductive material has a relative permeability which is greater than 10.

31. The magneto-inductive flowmeter as claimed in claim 28, wherein:
such a magnetically conductive material is used, that the separation to diameter ratio of the average separation to the outer diameter of said support tube multiplied by the relative permeability of the magnetically conductive material yields a value which is smaller than 100.

32. The magneto-inductive flowmeter as claimed in claim 28, further comprising at least two measuring electrodes for sensing electric potentials and/or electric voltages induced in the fluid flowing through the measuring tube and passed-through by the magnetic field, said measuring electrodes being arranged on said measuring tube and/or within a wall of said measuring tube, spaced from the at least one field coil.

* * * * *